(12) United States Patent
Kraft et al.

(10) Patent No.: US 9,129,263 B2
(45) Date of Patent: Sep. 8, 2015

(54) SYSTEM AND METHOD FOR AUTOMATICALLY BUILDING UP TOPIC-SPECIFIC MESSAGING IDENTITIES

(75) Inventors: Reiner Kraft, Gilroy, CA (US); Farzin Maghoul, Hayward, CA (US)

(73) Assignee: YAHOO! INC., Sunnyvale, CA (US)

( * ) Notice: Subject to any disclaimer, the term of this patent is extended or adjusted under 35 U.S.C. 154(b) by 250 days.

(21) Appl. No.: 12/628,902

(22) Filed: Dec. 1, 2009

(65) Prior Publication Data
US 2011/0131282 A1 Jun. 2, 2011

(51) Int. Cl.
*G06F 15/16* (2006.01)
*G06Q 10/10* (2012.01)

(52) U.S. Cl.
CPC .............. *G06Q 10/107* (2013.01); *G06Q 10/10* (2013.01)

(58) Field of Classification Search
CPC .............................. G06Q 10/10; G06Q 10/107
USPC ......................................................... 709/206
See application file for complete search history.

(56) References Cited

U.S. PATENT DOCUMENTS

| | | | | |
|---|---|---|---|---|
| 6,668,210 | B1 * | 12/2003 | Kim et al. ..................... 700/235 |
| 7,295,657 | B1 * | 11/2007 | Keohane et al. ............. 379/88.23 |
| 7,364,068 | B1 * | 4/2008 | Strubbe et al. ................ 235/376 |
| 7,643,822 | B2 * | 1/2010 | Ling et al. .................. 455/414.3 |
| 7,831,670 | B2 * | 11/2010 | Goodman et al. ............ 709/206 |
| 8,130,919 | B2 * | 3/2012 | Kalbag ...................... 379/88.22 |
| 2004/0205134 | A1 * | 10/2004 | Digate et al. .................. 709/206 |
| 2005/0060643 | A1 * | 3/2005 | Glass et al. ................. 715/501.1 |
| 2005/0210114 | A1 * | 9/2005 | Washburn ..................... 709/206 |
| 2006/0031533 | A1 * | 2/2006 | Goodman et al. ............. 709/227 |
| 2006/0047666 | A1 * | 3/2006 | Bedi et al. ...................... 707/10 |
| 2006/0075024 | A1 * | 4/2006 | Zircher et al. ................ 709/205 |
| 2006/0150119 | A1 * | 7/2006 | Chesnais et al. .............. 715/810 |
| 2006/0168045 | A1 * | 7/2006 | Pickover ....................... 709/206 |
| 2006/0184381 | A1 * | 8/2006 | Rice et al. ......................... 705/1 |
| 2006/0259555 | A1 * | 11/2006 | Hassounah et al. ........... 709/206 |
| 2007/0118653 | A1 * | 5/2007 | Bindal .......................... 709/226 |
| 2007/0244980 | A1 * | 10/2007 | Baker et al. ................... 709/207 |
| 2007/0245006 | A1 * | 10/2007 | Lehikoinen et al. .......... 709/223 |
| 2008/0046511 | A1 * | 2/2008 | Skrenta ......................... 709/204 |
| 2008/0133541 | A1 * | 6/2008 | Fletcher et al. .................. 707/10 |
| 2008/0256107 | A1 * | 10/2008 | Banga et al. .................. 707/102 |
| 2008/0270539 | A1 * | 10/2008 | Jennings et al. .............. 709/205 |
| 2009/0265224 | A1 * | 10/2009 | Tarr et al. ........................ 705/10 |
| 2009/0265382 | A1 * | 10/2009 | Freiman et al. ............ 707/104.1 |
| 2010/0049702 | A1 * | 2/2010 | Martinez et al. .................. 707/4 |
| 2010/0049812 | A1 * | 2/2010 | Brown et al. ................. 709/206 |
| 2010/0064015 | A1 * | 3/2010 | Sacks et al. .................. 709/206 |
| 2010/0293576 | A1 * | 11/2010 | Hnyk et al. ...................... 725/41 |
| 2010/0313250 | A1 * | 12/2010 | Chow ................................ 726/5 |

* cited by examiner

*Primary Examiner* — Jonathan Bui
(74) *Attorney, Agent, or Firm* — Pillsbury Winthrop Shaw Pittman LLP

(57) ABSTRACT

A method for automating interaction with a messaging system receives a first message from the messaging system, associates the first message with a topic, assigns the first message to an identity associated with the topic, maps content to the first message, creates a second message based on the content, and sends, via the identity, the second message to the messaging system. The first message may be screened for quality and assigned a quality score, and if the quality score does not exceed a predetermined threshold, then the second message will not be sent to the messaging system.

24 Claims, 2 Drawing Sheets

SYSTEM AND METHOD FOR AUTOMATICALLY BUILDING UP TOPIC-SPECIFIC MESSAGING IDENTITIES

BACKGROUND

1. Field of the Invention

Aspects of the present invention relate generally to a system and method for automatically increasing the follower count of a messaging identity.

2. Description of Related Art

There currently exist a number of messaging platforms through which users can "follow" and otherwise interact with other users, and through which they themselves can be followed by other users of the platform. A large following on one of these messaging platforms can mean the ability to influence a large number of people, which ultimately can be advantageous for the user, company, etc. being followed (e.g., they may be able to quickly tell their followers about a particular product so that the followers might consider purchasing it).

Generally, the best way to generate a large following is to 1) provide good content and 2) interact with a large number of users. By doing both of the above, chances are increased that some users of the system will decide to follow you. However, a problem with this approach is that it requires constant human attention, time and effort.

Thus, it may be desirable to automate interactions with other users of the messaging platform in an effort to increase the size of a particular user's following, and to leverage automatically the particular user's audience for various commercial or other ends.

SUMMARY

Embodiments of the present invention overcome the above-mentioned and various other shortcomings of conventional technology and methodologies, by providing an automated system and method for increasing the number of users that follow a particular user of the messaging platform.

BRIEF DESCRIPTION OF THE DRAWING FIGURES

DETAILED DESCRIPTION

Figure 1:
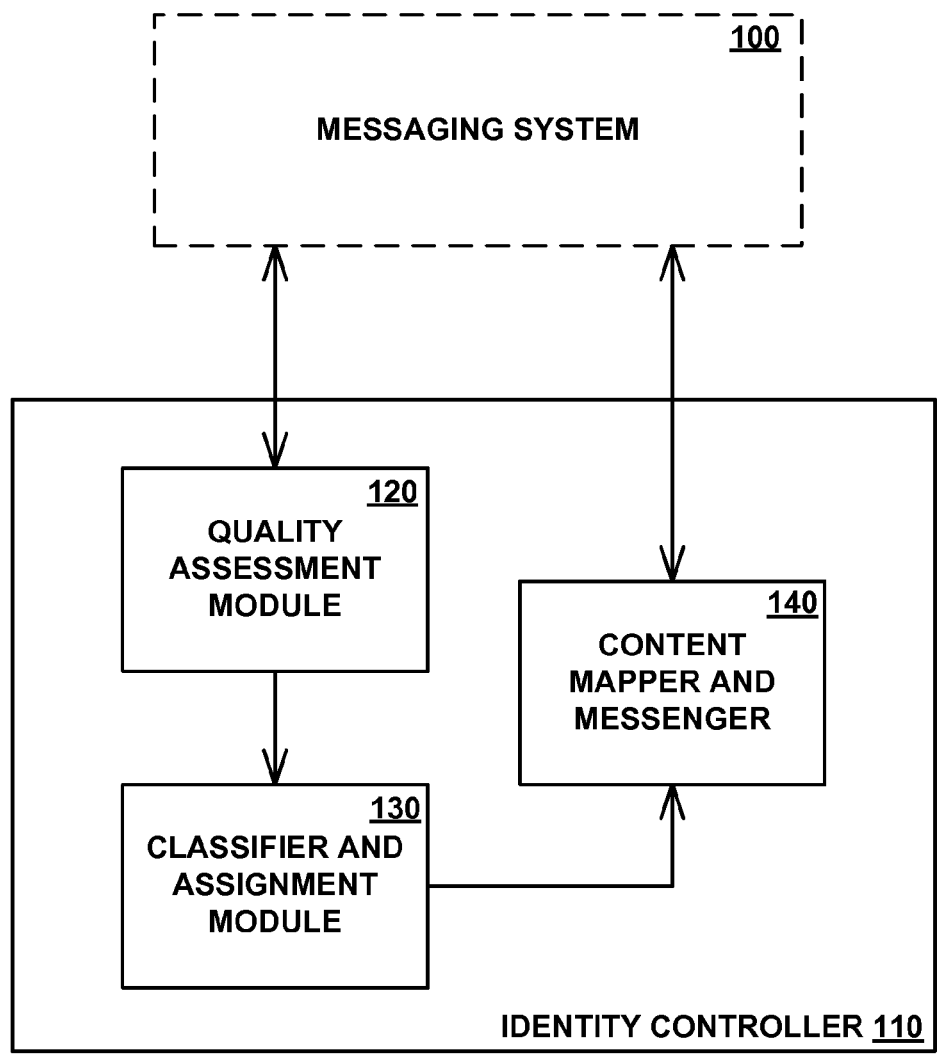
FIG. 1 is a simplified functional block diagram illustrating the general architecture of the invention according to an embodiment.

Detailed descriptions of one or more embodiments of the invention follow, examples of which may be graphically illustrated in the drawings. Each example and embodiment is provided by way of explanation of the invention, and is not meant to be construed as a limitation of the claimed subject matter. For example, features described as part of one embodiment may be utilized with another embodiment to yield still a further embodiment. It is intended that the appended claims be interpreted broadly to include these and other modifications and variations.

Aspects of the present invention are described below in the context of automating a process of building up a large number of followers on a messaging platform, on a topic-by-topic basis.

Throughout this disclosure, reference is made to "messaging system," which is used to denote a system through which users, who have an account with the messaging system, may interact with each other via messages. Generally, within such a system, user 1 can "follow" user 2 such that user 1 receives messages made to the system by user 2. It may or may not be the case that user 1 can see messages from user 2 that are directed to user 3. Users of such a messaging system generally recognize that their messages may be read by anyone interacting with the messaging system, and also that they may receive messages directed to them from users that they do not normally converse with, or that they were not previously aware of.

It is assumed for purposes of the present invention that any such messaging system allows third parties (e.g., one implementing the various embodiments described herein) to receive all, or a subset of all, the messages sent within the messaging system. Such messages may be relayed and received in any of a number of different ways, such as, for example, Really Simple Syndication (RSS), Extensible Messaging and Presence Protocol (XMPP), PubSubHubbub, or some combination of any "firehose," "pull" or "push" architecture. It will be appreciated that the method by which the "feed" of messages is relayed to and received by the third party is not critical to the invention.

Throughout this disclosure, "identity" is used to denote a user of a messaging system (as just described) who is under the control of the various embodiments of the identity controller described herein. Identities' interactions with the messaging system generally are automated, via an identity controller, and are executed in an effort to increase an identity's following, or to leverage an identity's following for various reasons. An identity may be either an entity (e.g., the name of a celebrity or a brand name) or a concept (e.g., gardening).

Relatedly, throughout this disclosure, "user" is used to denote a user of the messaging system who is not under the control of the various embodiments of the identity controller described herein. Generally, users' interactions with the messaging system will not be automated, but rather will be at the behest of humans associated with the account (e.g., "Joe" sending a message to "Sarah," or Joe making a statement visible to all users of the messaging system, etc.); however, some users may indeed be automated.

To be clear, "identities" and "users" are both users of the messaging system (i.e., each has an account with the messaging system), but an identity's interactions with the messaging system are controlled by an identity controller, whereas a user's interactions are not. Finally, throughout this disclosure, messages sent by a user to a messaging system may be referred to as user messages, and those sent by an identity may be referred to as identity messages.

It generally is recognized that within a messaging system as just described, the more followers an identity/user has, the greater the identity's/user's ability to effect a particular result. For example, if the end goal is to cause a large number of people to buy product X from company Y, then an identity/user with 1000 followers likely would have a better chance of meeting that goal than would an identity/user with just 10 followers. To this end, an identity controller (as described herein) may be employed to automate the interactions required of an identity in order to increase the identity's follower count.

FIG. 1 is a simplified functional block diagram illustrating the general architecture of an embodiment of an identity controller. Messaging system 100 is a system and service as described above. Messaging system 100 is shown in phantom so as to make clear that it may not be owned and/or operated by the same entity as the identity controller. It is assumed that messaging system 100 offers some type of programmatic interface for interacting with the system (e.g., an application programming interface (API), or similar) via a communications network (e.g., the Internet), including, for example, sending/receiving messages to/from it.

Identity controller 110 may receive, on an ongoing basis, all, or a subset of all the messages sent and received via messaging system 100. It will be appreciated that, depending on the setup of messaging system 100, certain messages sent directly from one identity/user to another may not be accessible to identity controller 110 if one of its identities is not involved in the communication. As discussed above, such messages may be relayed and received in any of a number of different ways, depending on the implementation of messaging system 100, including RSS, XMPP, PubSubHubbub, etc.; messages may be "pushed" to identity controller 110, or may be sent in response to a request received from identity controller 110. It will be appreciated that identity controller 110 may include any of a number of servers, databases, and other components or hardware resources required for its operation, and that the combination of computers and other equipment used are not critical to the invention.

Quality assessment module 120 may perform an initial review of the received messages in an effort to assess the quality of each message. As described below with reference to FIG. 2, the messages that are determined to be of a high enough quality (based on, for example, a predetermined threshold) may be passed to classifier and assignment module 130, where each message may be classified as belonging to one or more topics. Based on the topic(s) to which each message is determined to belong, each message may be assigned to one or more identities associated with the topic(s), where the identities are 1) users of messaging system 100 and 2) under the control of identity controller 110.

Classifier and assignment module 130 may send the messages and their associated identities and topics to content mapper and messenger 140, where the messages may be mapped against content known to or identifiable by identity controller 110. Generally such content is a resource (e.g., a web page, an image, a video, etc.) and may be associated with a mechanism by which the content may be shared, such as, for example, a Uniform Resource Identifier (URI; hereafter, "link"). The content may be either something that was produced by the owner/operator of identity controller 110 or something that otherwise is known to identity controller 110. For example, if the owner/operator of identity controller 110 also runs a large search engine (e.g., Yahoo!®, Google™, etc.), then it may be aware of, and be able to easily access and assess content from resources that are not under its direct control. It will be appreciated that even if the owner/operator of identity controller 110 does not also operate a search engine, it still may have access to a search engine via a programmatic interface provided by the search engine.

Content mapper and messenger 140 also may send a message to messaging system 100, which message may be directed either to a particular user of messaging system 100, to all of a particular identity's followers, to all users of messaging system 100, or to some combination and/or subset thereof. The message sent by content mapper and messenger 140 to messaging system 100 will appear to its recipient to have come from the identity associated with it. In other words, by using the programmatic interface provided by messaging system 100, content mapper and messenger 140 may send the identity message to messaging system 100 as the identity. If this were not the case, then it would be difficult for the identity to persuade users to follow it.

It will be appreciated that identity controller 110 illustrated in FIG. 1, including quality and assessment module 120, classifier and assignment module 130 and content mapper and messenger 140 may be implemented as hardware elements (e.g., application specific integrated circuit (ASIC) components, system on chip (SoC) components, or other dedicated electronic hardware) in some instances; in some applications, such hardware elements may be selectively reprogrammable via firmware instructions or register settings. Alternatively, the modules depicted in FIG. 1 may be wholly or partially embodied in or implemented by software or other instruction sets executable by general-purpose hardware components. Further, it is noted that the several components and modules of FIG. 1 may be split further into additional, more specific modules and/or may be distributed across more than one physical machine (e.g., computer workstation or server).

Figure 2:
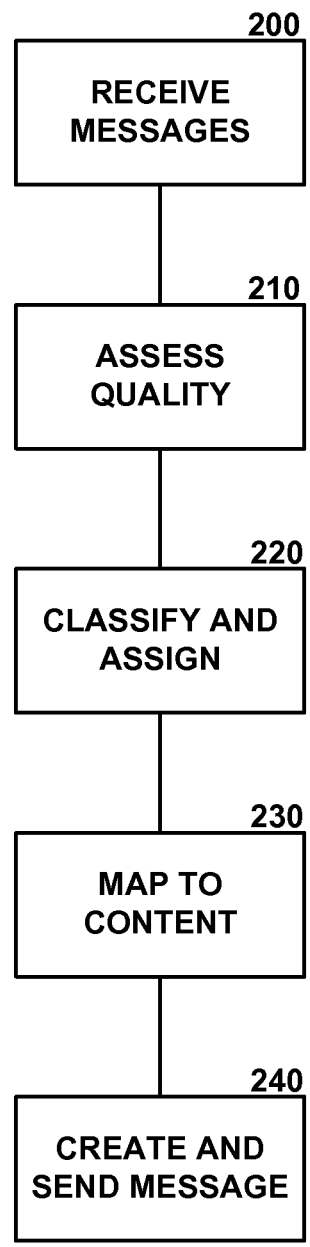
FIG. 2 is a logical flowchart illustrating one general process by which an identity controller may operate according to an embodiment.

FIG. 2 is a logical flowchart illustrating one general process by which identity controller 110 may operate according to an embodiment. Elements of FIG. 1 will be referenced throughout the discussion of FIG. 2. At block 200, one or more messages may be received at identity controller 110, which may pass them to quality assessment module 120 at block 210, where the perceived quality of each message may be determined. The general end goal of assessing message quality is to filter out messages created via automated, non-human means, because the users that create these kinds of messages likely will not be useful for future leveraging of an identity's followers (e.g., it is unlikely that an automated user will click on a link provided by an identity and, say, purchase a product available from the web page pointed to by the link).

Message quality may be based on any combination of various, known indicators, including those derived from the message itself and those derived from aspects of the user who sent the message, and it will be appreciated that the method(s) used is not critical to the invention. Examples of indicators based on the message itself include whether the message contains a link to content outside of messaging system 100 and/or whether the message contains certain keywords that suggest the user is marketing something (e.g., "product," "buy," etc.). The "type" of message also may be analyzed. For example, a message that ends with a question mark (and thus, likely is a question) may be ascribed a higher quality than a message that ends with an exclamation point, because, for example, if the user can be given a satisfactory answer to his question, then he may be more apt to follow the user who gave him the answer (e.g., an identity controlled by identity controller 110). Quality also may be affected by whether the message is directed to, for example, a specific identity or other user of the system, or if it is broadcast to no one in particular.

Examples of indicators based on the user who sent the message include analyzing the number of messages the user has sent over a predetermined period, whether the user has sent the same message to multiple recipients, and the number of other users this particular user follows (e.g., if this particular user follows a large number of other users, it may be deemed an automated user, and the message thus ascribed a lesser quality).

In an embodiment, a quality score may be given to each message based on one or a combination of the indicators described above, or a combination of these and other factors; if a message's score is above a predetermined threshold, it may be forwarded to classifier and assignment module 130, and if the message's score is below the predetermined threshold, it may be discarded such that no identity message is sent to messaging system 100 in response to it. It generally is important for each identity to maintain high-quality content on its stream (i.e., its public-facing messages), including the messages it sends to other users, and such quality may be compromised by reacting/responding to automated or otherwise frivolous user messages.

In another embodiment, quality assessment module 120 may be bypassed entirely, in which case classifier and assignment module 130 may receive messages directly from messaging system 100. As discussed, the filtering of user messages for quality may be sometimes important, but in some circumstances, such as when sufficient processing resources and computational bandwidth are not available, network data traffic conditions are high, or a combination of these and other factors, it may not be feasible to screen every message.

At block 220, classifier and assignment module 130 may receive the messages from quality assessment module 120, where they may be classified by topic and "assigned" to an identity controlled by identity controller 110. Classification may be done via any of a number of various ways currently used to categorize a word, phrase or other content into a particular topic(s), including those that may be used by a search engine when it receives a query and determines search results in response to the query. Also, classification may be based on the words associated with the message, the content contained at a resource pointed to by a link within the message, or some combination thereof. Classification may be sometimes important because if a message is classified poorly, then a resulting identity message may not correspond at all to the user message that prompted it, which means that a recipient likely will ignore the identity message and almost certainly will not follow the identity in response to it.

As an example, consider the following user message: "What is the best time of year to plant tomatoes in northern California?" Classifier and assignment module 130 may analyze the words and phrases used (e.g., "time of year," "plant" and "tomatoes") and may deduce that the message most properly belongs—as among the topics for which identity controller 110 is aware (and to which an identity covering the topic exists)—to the "gardening" topic. In an embodiment, "concept networks" or similar mechanisms currently used by, for example, search engines, may be leveraged to aid in the classification effort. It will be appreciated that the method(s) used to classify a message as belonging to a particular topic(s) is not critical to the invention.

Generally each topic may be associated with a single identity (controlled by identity controller 110), but in an embodiment a topic may be associated with multiple identities. Revisiting the "gardening" message discussed above, the particular message may be assigned to an identity charged with sending and receiving messages related to gardening.

At block 230, each message and its associated topic and identity may be received by content mapper and messenger 140, where content may be mapped against the topic and relayed within an identity message sent to messaging system 100. Finding content related to a particular message and the topic to which it is associated may be done in any of various ways currently known in the art, and it will be appreciated that the method(s) used is not critical to the invention. For example, the message and/or topic, related topics, etc., may be searched for via one or more search engines, and a corresponding search result referenced in the message. Similarly, contextual searching may be done based on the message, such that keywords are distilled from the message and used as a query(ies) to a search engine.

Further, a service accessible to identity controller 110 already may categorize into topics content from around the Internet—creating what effectively is a directory—in which case content mapper and messenger 140 may provide a link to a folder or group within the directory that may be related to the received message. For example, in response to the message discussed above—"What is the best time of year to plant tomatoes in northern California?"—content mapper and messenger 140 may determine that in a directory it has access to, there is a group (folder, topic, etc.) that corresponds to the gardening topic with which the message is associated. In this case, the following illustrative message may be sent, at block 240, to the user who asked the question: "Find out more about growing tomatoes at http://adirectoryoftopics.com/groups/gardening." To be clear, the message would be sent from the gardening identity, which may convince the user to follow the gardening identity on messaging system 100.

In an embodiment, identity controller 110 may be operated by the same entity that operates a search engine (or similar), in which case identity controller 110 may leverage all of the entity's searching technology, including verticals within the organization, that may help to find relevant, useful content related to the message and/or its topic. For example, and as discussed above, the entity may maintain a directory of various topics, which directory may be mined for information related to the particular topic.

Generally, the message sent, at block 240, to messaging system 100 may be directed to a particular user of messaging system 100, namely the user which necessitated the response, but in some circumstances the message may be sent to the identity's stream where it may be seen by anyone (or just those following the identity, etc.), to some other subset of users, or to a combination thereof. Over time, as an identity sends out more and more messages, some of those messages, especially those that are particularly helpful or useful, likely will result in users choosing to "follow" the identity that sent them, thus increasing that identity's following and giving that identity more influence and power.

In an embodiment, identity messages need not be based at all on user messages, and in fact may simply be informative or otherwise useful with respect to the topic associated with the entity. For example, an entity may send a message to messaging system 100 that says "10 essential gardening tips: http://gardeningtipstricks.com," which message may not be directed to any user in particular and which generally may be viewed by any user of the system. Such messages may be helpful in convincing a user who happens upon the identity's stream (perhaps in response to an identity message directed to the user) to follow the identity.

In some instances it may make sense to throttle identity messages so that identities are not seen as spam or otherwise annoying, either by the users themselves or by automated means implemented by messaging system 100. For example, if an identity sends a message to a particular user, and the message piques the user's interest enough to cause the user to view other messages sent by the identity, the user may be turned off if he sees that the identity sent out 143 messages that day (i.e., the user would be less inclined to follow the identity). Such throttling might limit each identity to sending a single message per day to a particular user, sending no more than 10 total messages per day to either the identity's stream or other users, or any other protocol that limits the number of messages an identity can send over a given period.

There are many commercial and other opportunities that can be leveraged once an identity has built up a large following. For example, identities can be used to disseminate links to content owned by the same entity that owns identity controller 110, thus increasing traffic (and consequently, page views, ad impressions, etc.) to that content. Also, an advertiser might pay identity controller 110 to send a message to messaging system 100 that includes an advertisement. For example, and going back to the gardening identity discussed above, a seller of garden equipment may wish to target directly those interested in gardening by using the gardening identity to send an ad to all of the identity's followers (e.g., "Check out our garden hoes; half off with this coupon!" http://buyourgardentools.com/coupon," etc.).

Another opportunity might exist for an identity's following to be sourced for answers to a query sent to a search engine. For example, and going back to the gardening example used throughout this disclosure, consider that the question posed —"What is the best time of year to plant tomatoes in northern California?"—actually is asked of a search engine. If the query can be categorized into the "gardening" category, then the gardening identity could present the question to all of its followers by sending a message to messaging system 100 via identity controller 110. Assuming there are a large enough number of followers of the gardening identity, it might be possible get fast and relevant answers to the question via messaging system 100, which answers then could be forwarded to the user of the search engine and presented substantially concomitantly with the "regular" search results.

The sequence and numbering of blocks depicted in FIG. 2 is not intended to imply an order of operations to the exclusion of other possibilities. Those of skill in the art will appreciate that the foregoing systems and methods are susceptible of various modifications and alterations. For example, it may not necessarily be the case that user messages are checked for quality at block 210; instead, this step may be skipped entirely.

The various systems described herein may each include a storage component for storing machine-readable instructions for performing the various processes as described and illustrated. The storage component may be any type of machine-readable medium (i.e., one capable of being read by a machine or electronic component) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method implemented on a machine having at least one processor, storage, and a communication platform connected to a network for interacting with a messaging system, said method comprising:

receiving a first message sent to the messaging system from a user;
identifying a topic associated with the first message;
assigning the first message to an entity based on the topic;
mapping, when a number of interactions from the user to the entity occurred within a specified period is below a threshold, a piece of content consistent with the topic of the first message;
creating a second message based on the piece of content; and
sending, on behalf of the entity, the second message to a plurality of users of the messaging system.

2. The method of claim 1 further comprising determining whether the user is a human user.

3. The method of claim 1 further comprising preventing the second message from being sent to the plurality of users if quality of the first message is below a specified level.

4. The method of claim 1 wherein said identifying is based on a word within the first message.

5. The method of claim 1 wherein, if the first message contains a link, then said identifying is performed in a manner that is based on information found at the link.

6. The method of claim 1 wherein said mapping comprises searching for a resource related to the first message.

7. The method of claim 6 wherein the second message contains a link to the resource.

8. The method of claim 6 wherein said searching comprises using a search engine.

9. The method of claim 1 wherein the second message is directed to the user.

10. The method of claim 1, wherein the plurality of users include all users other than the entity in the messaging system.

11. A system, implemented on a machine having at least one processor, storage, and a communication platform connected to a network for interacting with a messaging system, the system comprising:

a quality assessment module implemented on the at least one processor and configured to:
  receive a first message from a user;
a classifier and assignment module implemented on the at least one processor and configured to:
  identify a topic associated with the first message; and
  assign the first message to an entity based on the topic;
a content mapper and messenger module implemented on the at least one processor and configured to:
  receive, when a number of interactions from the user to the entity occurring within a specified period is below a threshold, from the classifier and assignment module the first message, the topic and an identifier of the entity associated with the entity to which the first message is assigned;
  map a piece of content consistent with the topic of the first message;
  create a second message based on the piece of content; and
  send, on behalf of the entity, the second message to a plurality of users of the messaging system.

12. The system of claim 11, wherein the quality assessment module implemented on the at least one processor is further configured to determine whether the user is a human user.

13. The system of claim 11 wherein the quality assessment module implemented on the at least one processor is further configured to prevent the first message from being received by the classifier and assignment module if a quality of the first message is below a specified level.

14. The system of claim 11 wherein the first message is received from the messaging system and the second message is sent to the messaging system via a programmatic interface provided by the messaging system.

15. The system of claim 11 wherein the second message is directed to the user.

16. A machine-readable non-transitory medium having information recorded thereon for interacting with a messaging system, wherein the information, when read by a machine, causes the machine to perform the following:
   receiving a first message from a user;
   identifying a topic associated with the first message;
   assigning the first message to an entity based on the topic;
   mapping, when a number of interactions from the user to the entity occurred within a specified period is below a threshold, a piece of content consistent with the topic of the first message;
   creating a second message based on the piece of content; and
   sending, on behalf of the entity, the second message to a plurality of users of the messaging system.

17. The medium of claim 16 wherein the information, when read by the machine, further causes the machine to perform determining whether the user is a human user.

18. The medium of claim 16 wherein the information, when read by the machine, further causes the machine to perform preventing the second message from being sent to the plurality of users if a quality of the first message is below a specified level.

19. The medium of claim 16 wherein said identifying is based on a word within the first message.

20. The medium of claim 16 wherein, if the first message contains a link, then said identifying is performed in a manner that is based on information found at the link.

21. The medium of claim 16 wherein said mapping comprises searching for a resource related to the first message.

22. The medium of claim 21 wherein the second message contains a link to the resource.

23. The medium of claim 21 wherein said searching comprises using a search engine.

24. The medium of claim 16 wherein the second message is directed to the user.

\* \* \* \* \*